US005102730A

United States Patent [19]

Muller et al.

[11] Patent Number: 5,102,730

[45] Date of Patent: Apr. 7, 1992

[54] ERASABLE REPRODUCTION MATERIAL

[75] Inventors: Peter Muller; Henry Mustacchi, both of Port Washington; Leonard Kreicas, Long Island; George Schmitz, Roslyn Heights, all of N.Y.

[73] Assignee: Andrews Paper & Chemical Co., Inc., Port Washington, N.Y.

[21] Appl. No.: 482,040

[22] Filed: Feb. 20, 1990

[51] Int. Cl.[5] .......... B32B 5/16; B32B 23/04

[52] U.S. Cl. .......... 428/323; 428/511; 428/533; 428/537.5; 428/913; 428/918; 162/135

[58] Field of Search .......... 428/303, 918, 913, 537.5, 428/511, 533; 162/135

[56] References Cited

U.S. PATENT DOCUMENTS 4,447,487 5/1984 Maekawa et al. .......... 428/537.5
4,503,118 3/1985 Murakami et al. .......... 428/537.1
4,513,056 4/1985 Vernois et al. .......... 428/918 X
4,569,888 2/1986 Muller et al. .......... 428/513 X

FOREIGN PATENT DOCUMENTS 3216840 12/1982 Fed. Rep. of Germany .......... 428/513
3543597 6/1987 Fed. Rep. of Germany .......... 428/513

*Primary Examiner*—P. C. Sluby
*Attorney, Agent, or Firm*—Kane, Dalsimer, Sullivan, Kurucz, Levy, Eisele & Richard

[57] ABSTRACT

Written, typed, penciled, inked, xerographic and other markings on foils, opaque and transparent papers can be erased easily by mechanical means by utilizing an interlayer of alkylketene dimer with hydrophilic colloids and pigments. The provisions of such an interlayer is useful for drafting materials, xerographic and diazotype copies.

2 Claims, 1 Drawing Sheet

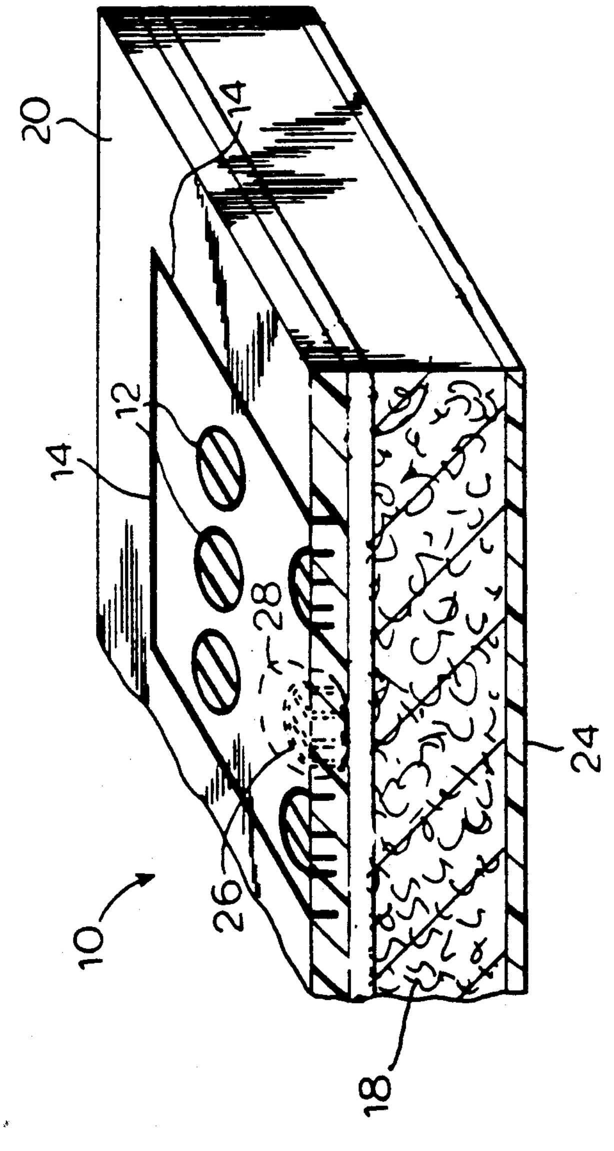
20
14
12
14
28
26
10
24
18

ERASABLE REPRODUCTION MATERIAL

BACKGROUND OF THE INVENTION

1. Field of the Invention

The invention relates to easily erased surfaces, such as erasable paper surfaces.

2. Brief Description of the Prior Art

Printed and copied sheet material bearing text or drawings often need correction of the markings for further direct use as copy intermediates, from which new copies can be made. Markings on such sheet materials are physically anchored to the base sheet in different degrees and often cannot be physically removed without damaging the material of the base sheet.

The desirability for easy mechanical erasure without affecting the base sheet has led, in the past, to erasable surfaces obtained through the application of synthetic resin surface layers on the base sheet which prevent the penetration of the markings into the base sheet structure. Such coatings are considered barrier layers. Their adhesion to the base sheet is in general, less than to the markings and as a result, the entire barrier layer is usually removed with the markings during the process of physical erasure.

A shortcoming of such materials is found in that the entire area of erasure around the removed markings-becomes more transparent on opaque sheets and more so on translucent foils or papers where the difference of translucency affects the background uniformity when reprints are made.

We have discovered that barrier coating compositions of our invention consisting of a mixture of alkylketene dimer, hydrocolloids and pigments on base sheets for copying, resist removal by erasing to a greater degree than the prior known barrier layers, while their adherence to conventional marking materials or electrophotographic and even diazo overcoats is reduced. This occurs because the alkylketene dimer component is chemically reactive with the hydroxy radicals of cellulose and hydrocolloids, and chemically bonds to the base sheet. In this way, reproduction materials are obtained wherein the after-applied toners, coatings or markings can be easily removed through physical erasure, without damage to the barrier coating or the base sheet.

Alkylketene dimers have been used in the prior art as both an internal alkaline size and a surface size for paper. The treatment of paper with alkylketene dimer size renders the paper water repellant. The water resistance obtained is stable to acid, alkali or neutral aqueous materials. However, papers sized internally with alkylketene dimers do not exhibit the easy erasability characteristics disclosed in the present invention unless they are additionally coated with compositions of the invention. Surprisingly, it has been found that coating compositions of this invention applied to various paper surfaces not only increase the hold out against water, but also reduce the adhesiveness of various coatings and markings applied thereto afterwards so that they can be easily removed through physical erasure when required. This discovery applies to xerographic markings, to drafting inks, ink jets, pencilling and even diazotype overcoatings.

The base sheets, surface coated with compositions of the invention have been found to be particularly useful as base supports for xerox copying and for drafting applications with inks and pencils.

Erasable materials for xerox copying of the prior art can be considered as base materials with laminated layers which are prepared by applying to a mostly transparent or opaque, paper base, a barrier coating which is impervious to the components of a single or double overcoating with pigments and resins. The barrier coatings consisted mainly of resins in organic solvent systems.

In xerox copying, the toner is applied for imagewise adhesion to the latent picture and the imagewise adhering toner portion is thermally fused and anchored in the barrier coating layer. Handling of the material during the copying steps and afterwards usage for making reprints requires mechanical stability of the material so that no valuable information on the print is deleted.

The above-described prior art processes depend on a precarious balance of the composition of the coating layers.

The barrier layer resins must have an affinity to the toner particles which adhere to the barrier layer by purely adhesive forces before being anchored into the barrier layer by thermal fusion.

An inherent problem of such barrier coating systems is the precarious balance of resin compositions including pigments that finally control toner receptivity and erasability, print contrast, image definition and mechanical print surface resistance.

Higher resin concentrations improve mechanical resistance, but affect negatively erasability.

Higher pigment concentrations improve, ease of erasability, but decrease mechanical print surface resistance.

The present invention overcomes all of the above shortcomings and provides sheets for markings and second originals on opaque and translucent paper, for fine grain reproduction with high reprint contrast and which process easily through conventional electrophotographic copying equipment. They can be easily erased.

A further advantage of the present invention resides in the universal application to xerographic, drafting, diazotype and like processes. Barrier layers, in the past, required specific compositions for the various applications, to fit the particular requirements for diazotypes, xerographic copies or drafting surfaces. They often require substantial coating weights. Such barrier layers often require organic solvents or at least solvent-water mixtures for their applications. The present process enables one to use relatively lightweight aqueous coating preparations in the process of the invention.

SUMMARY OF THE INVENTION

The invention comprises an erasable material for marking and reproduction purposes which comprises:

a base sheet having applied to at least one surface thereof a coating which comprises a mixture of:

(i) an alkylketene dimer (ii) a hydrocolloid and/or a vinyl or acrylic polymer resin (iii) a pigment.

In a preferred embodiment of the invention, the material is an erasable opaque or transparent sheet for xerox copying or a vellum for ink and pencil drawings.

The materials of the invention provide, for example, originals for diazotype copies with controlled erasability, from substantially aqueous preparations.

The materials of the invention provide for marking with pencils, inks and electrophotographic toners with good line continuity and for mechanical erasure of such markings without damage to the underlying base support surfaces. It has been found that surfaces of chemical pulp and cotton paper as well as synthetic resin or hydrocolloid impregnated papers, opaque or transparentized, when coated with the compositions of the invention change their surface characteristics and provide for easy mechanical erasability of markings applied thereto afterwards.

It has also been found that the improved erasability is a pure surface effect conveyed to the papers by the composition of the invention.

BRIEF DESCRIPTION OF THE DRAWING

The FIGURE is a greatly enlarged fragmentary view, partially in section, with various coating layers broken away, of an embodiment reproduction material of the invention.

DETAILED DESCRIPTION OF THE PREFERRED EMBODIMENTS OF THE INVENTION

The base support for easy erasable materials, for reproduction purposes, of the invention may be chosen from among all conventional bases used for drafting, xerographs, diazotypes, such as, for example, opaque and translucent papers, cloth and the like. The preferred base support, however, is translucent or transparentized paper.

The invention is applicable to many kinds of transparent base papers such as conventional rag and sulfite transparent and transparentized paper as well as to natural papers which can be transparentized in a third step with aqueous dispersions of paraffin wax with or without polyvinyl acetate or resin or with organic solvent resin solutions applied to the backside of the sheet. One such transparentized paper is described in the U.S. Pat. No. 4,569,888 (Muller et al.) as an example of preferred papers. The invention thus also permits the manufacture of easily erasable diazotype transparencies from natural nontransparent base paper in one pass through a conventional aqueous coating machine equipped with two front side and one backside coating stations.

In an initial step of the method of the invention, a coating is applied to the surface of the base support. The coating is advantageously obtained form an aqueous dispersion containing an alkylketene dimer, a hydrocolloid and a pigment.

Alkylketene dimers are a class of well-known compounds which may be represented by those having the general formula:

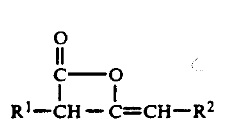

wherein $R^1$ and $R^2$ are each selected from alkyl, preferably alkyl having 8 to 24 carbon atoms, inclusive, most preferably 10 to 18 carbon atoms, inclusive.

The most preferred alkylketene dimers are commercially available, with long chain fatty fatty acid radicals, both saturated and unsaturated, such as oleic, palmitic, myristic and stearic acids.

It has been found that as alkylketene dimer the commercial grades manufactured by Hercules Incorporated, under the tradename of HERCON® and by Albright & Wilson Americas Inc. under the name of KEYDIME E® in the form of aqueous emulsions are particularly useful.

Coatings of alkylketene dimers are applied with the addition of hydrocolloids, with or without other resin dispersions, and pigments to render the base (paper) surfaces universally applicable to the various marking systems.

The coatings applied according to the process of the invention also comprise hydrocolloid (5 to 99 parts by weight of the alkylketene dimer).

Representative of hydrocolloids are starches and their various derivatives, dextrins, gum arabic, alginates and their esters, tragacanth, among others. Also polyvinylpyrrolidone, caseinates or vegetable proteins, gelatin, and polyvinyl alcohols.

Optional additives in the coating compositions of the invention include synthetic polymeric resins. Resins include polymers of vinyl acetates and their copolymers, acrylates, vinyl chlorides, vinylidene chloride, acrylonitrile and styrene.

Conventionally employed pigments are also added to the coatings, to affect toner and pencil receptivity.

After drying of the coating, the film layer so formed may be overcoated with a solution containing diazotype components.

Referring now to the embodiment of FIG. 1, a toner, ink or pencil image reproduction 10 is depicted, applied and thermally fused. Indicia 12 and lines 14 are formed on the layer 20 formed by a coating of an alkylketene dimer/hydrocolloid/Pigment composition. A support base sheet 18, which may be any of the base sheets used for xerox, drafting or diazotypes, is coated on its upper surface with layer 20. As previous indicated, layer 20 is formed by the barrier coating forming ingredients applied from an aqueous dispersion and may contain other components as discussed above to modify the characteristics of layer 20.

A backcoating 24 is applied to the lower surface of base sheet 18 to prevent curling of the coated base sheet after drying. Backcoat 24 may also be identical to layer 20.

In the cut-away section of FIG. 1 indicia 12 is depicted as being erased. The erased indicia 26 illustrates the condition of the layer 20, after the indicia has been erased. The erased indicia 26 is rubbed away and shows a cavity 28 extending through the layer 20. The base 18 is intact. This resistance results from the chemical bond between the cellulose of the paper base sheet and the alkylketene dimer. Since erased indicia 26 do not penetrate into the upper surface of base sheet 18 there is no "ghosting".

The following examples describe the manner and method of making and using the invention and set forth the best mode contemplated by the inventor, but are not to be construed as limiting. All parts specified are by weight unless otherwise stated.

Where specified, test results were obtained by the following procedures:

EXAMPLE 1

A 100% rag slack sized paper of 52 $g/m^2$ substance weight was transparentized with an aqueous solution of a low viscous starch in a size press, wet packed for 1 hour and redried to a substance eight of 62 $g/m^2$.

The dry paper was then passed through a size press for the application of the following composition:

| | |
|---|---|
| 6% aqueous solution if oxidized starch | 40 parts |
| Aluminum Silicate (particle size 1.5 Micron) | 5 parts |
| 12.5% solids aqueous dispersion of akylketene dimer supplied by Hercules Inc. under the tradename of HERCON ® 70 | 60 parts |

After drying the substance weight of the paper had increased to 65 $g/m^2$

EXAMPLE 2

A 100% rag vellum base paper of 68 $g/m^2$ substance weight was overcoated on both sides in a conventional air knife coating machine equipment with 2 coating stations and dryer passes after each coating application, with the following preparation:

| | |
|---|---|
| Water | 41 parts |
| Gelatin | 3 parts |
| Silica, (particle size 1 micron) | 5 parts |
| 10% aqueous dispersion of alkylketene dimer as supplied under the trade name of KEYDIME E ® by Albright Wilson Americas. | 50 parts |

The substance weight of the dried vellum had risen to 71 $g/m^2$.

EXAMPLE 3

A 25% rag-75% chemical pulp paper of 58 $g/m^2$ substance weight, was transparentized and treated with an alkylketene dimer-starch pigment dispersion as in example 1.

The substance weight had increased to 62 $g/m^2$.

EXAMPLE 4

A 100% chemical pulp bond sheet of 73 $g/m^2$ substance weight with internal rosin sizing was surface sized with a dispersion composed of:

| | |
|---|---|
| Water | 12 parts |
| 10% aqueous solution of polyvinyl alcohol | 25 parts |
| Silica (particle size 1.5 micron) | 3 parts |
| 12.5% aqueous dispersion of alkylketene dimer as supplied under the trade name of HERCON ® 70 by Hercules Inc. | 60 parts |

After drying the substance weight had increased to 77 $g/m^2$.

EXAMPLE 5

A 100% rag-paper of 60 $g/m^2$ substance weight was conventionally transparentized with a 25% solution of polybutene 1200 Mw in toluene, wet packed and dried to a substance weight of 65 $g/m^2$. The highly transparent sheet was over coated in a conventional air knife coating machine with 2 coating stations for front and back side coating and with a drying pass after each coating application, with the following preparations:

| | |
|---|---|
| 20 parts | Water |
| 4 parts | Aluminum silicate, (particle size 1μ) |
| 3 parts | Dextrine |
| 8 parts | 4.5% Vinylacetate, homopolymer aqueous dispersion |
| 65 parts | 12.5% aqueous dispersion of alkylketene dimer as supplied under the trade name of HERCON ® 70 by Hercules Inc. |

The surfaces of paper samples 1, 2, 3, 4, and 5 were evaluated for the various applications as described below.

The surfaces of the same paper samples, but which had not been treated with the compositions of this invention were also evaluated in the same manner as controls.

The surfaces of paper samples from Examples 1, 2, 3, 4, 5 and 6 and of the same papers, but which had not been treated with the compositions of this invention, were marked in the following manners:

| | | |
|---|---|---|
| (A) | toner picture in a plain paper copier Xerox Model | |
| (B) | Pencil #2 | lines |
| B, 2 | Pencil #2 H | " |
| B, 3 | Pencil #4 H | " |
| B, 4 | Pencil #8 H | " |
| (C) | India Ink lines | |
| (D) | Ball point ink lines | |
| (E) | Ink jet imprints | |

After applying the markings a rubber eraser was used to erase the markings.

The results of the treated and of the non treated samples are listed hereafter.

| Example | Receptivity for Markings | Clean Removal of markings with pencil eraser Eberhard Faber |
|---|---|---|
| 1 | very good A, B, C, D, E Fair D | easy A, B, C, D, E |
| 1 Control | very good A, B, C, D, E | easy B-1 through B-4 with slight ghosting poor; A, C, D, E |
| 2 | very good A, B, C, D, E Fair D | easy clean A, B, C, D, E |
| 2 Control | very good ABCDE | easy B-1 through B-4 with slight ghosting B-2, B-2 fair: C difficult D, E poor A |
| 3 | very good ABCE Fair D | easy ABCDE |
| 3 Control | very good ABCDE | easy B-1 through B-4 poor A, C, D, E, |
| 4 | very good ABCDE | easy A, B, C, D, E, |
| 4 control | | easy B-1 through B-4 poor A, C, D, E |
| 5 | very good ABCE | easy A, B, C, D, E |
| 5 control | very good ABCDE | fair B-1 through B-4 with some ghosting, poor A, C, D, E |

What is claimed is:

1. An erasable reproduction material, which comprises;

a paper base sheet having applied to at least one surface thereof a surface coating layer which consists essentially of a mixture of:

(i) an alkylketene dimer;

(ii) from 5 to 99 parts by weight of the alkylketene dimer, of a hydrocolloid selected from the group consisting of starches, dextrins, gum arabic, alginates, alginate esters, tragacanth, caseinates, vegetable proteins, gelatin, polyvinylpyrrolidone and polyvinyl alcohol; and (iii) a toner and pencil receptively affecting proportion of a pigment.

2. The erasable reproduction material of claim 1 wherein said base sheet is a transparentized base sheet.

* * * * *